US010384972B2

(12) United States Patent
Xu et al.

(10) Patent No.: US 10,384,972 B2
(45) Date of Patent: Aug. 20, 2019

(54) FUSED QUARTZ TUBING FOR PHARMACEUTICAL PACKAGING AND METHODS FOR MAKING THE SAME

(71) Applicants: Guangjun Xu, Cupertino, CA (US); Robert Koch, Shaker Heights, OH (US)

(72) Inventors: Guangjun Xu, Cupertino, CA (US); Robert Koch, Shaker Heights, OH (US)

(73) Assignee: MOMENTIVE PERFORMANCE MATERIALS INC., Waterford, NY (US)

( * ) Notice: Subject to any disclaimer, the term of this patent is extended or adjusted under 35 U.S.C. 154(b) by 0 days.

(21) Appl. No.: 14/174,439

(22) Filed: Feb. 6, 2014

(65) Prior Publication Data

US 2015/0218047 A1    Aug. 6, 2015

(51) Int. Cl.
*C03C 25/66* (2006.01)
*C03B 32/02* (2006.01)
(Continued)

(52) U.S. Cl.
CPC .............. *C03B 20/00* (2013.01); *C03B 17/04* (2013.01); *C03B 32/00* (2013.01); *C03C 3/06* (2013.01);
(Continued)

(58) Field of Classification Search
CPC ......... C03C 25/66; C03B 20/00; C03B 32/02; C03B 17/04; C03B 23/04; C03B 23/09; C03B 32/00; C03B 33/06
See application file for complete search history.

(56) References Cited

U.S. PATENT DOCUMENTS 3,061,495 A    10/1962 Alford
3,215,517 A *  11/1965 Zimmermann ....... C03B 23/097
                                              215/43
(Continued)

FOREIGN PATENT DOCUMENTS

CN       1850680       5/2006
JP     2001261364      9/2001
(Continued)

OTHER PUBLICATIONS

CN 103496705 abstract, Tian, Continuously producing high-purity fused quartz material at low cost comprises carrying out preheating and high-temperature chlorination on quartz sand to obtain high-purity quartz sand, melting into fused quartz, and cutting, Jan. 8, 2014.*

(Continued)

*Primary Examiner* — Queenie S Dehghan
(74) *Attorney, Agent, or Firm* — Joseph Waters; McDonald Hopkins LLC

(57) ABSTRACT

A method for forming high purity silica articles. The high purity silica articles can be particularly suitable for forming packaging such as packaging for pharmaceutical applications. The method for forming high purity silica articles can comprise, in one embodiment, (a) forming a fused quartz melt from a $SiO_2$ raw material; (b) forming a quartz tube from the fused quartz melt; (c) treating the quartz tube with an acid composition; (d) heat treating the quartz tube subsequent to treating with the acid composition; and (e) optionally treating the quartz article with an acid composition subsequent to the heat treating operation. The method can enhance the purity of silica glass articles and products made therefrom.

20 Claims, 3 Drawing Sheets

Vial 1

Juncture of Sidewall and Bottom 2 mm Above the Bottom 5 mm Above the Bottom

(51) Int. Cl.
*C03B 20/00* (2006.01)
*C03B 17/04* (2006.01)
*C03B 32/00* (2006.01)
*C03C 3/06* (2006.01)
*C03C 23/00* (2006.01)

(52) U.S. Cl.
CPC ...... *C03C 23/0075* (2013.01); *C03B 2201/03* (2013.01); *C03B 2201/30* (2013.01); *C03C 2201/02* (2013.01); *C03C 2201/30* (2013.01); *C03C 2203/10* (2013.01); *C03C 2203/52* (2013.01)

(56) References Cited

U.S. PATENT DOCUMENTS

| | | | |
|---|---|---|---|
| 3,868,170 A * | 2/1975 | DeLuca | C03B 19/06 385/123 |
| 4,804,422 A | 2/1989 | Papanikolau et al. | |
| 5,785,729 A | 7/1998 | Yokokawa | |
| 6,296,826 B1 * | 10/2001 | Fujinoki | C03B 19/1005 423/335 |
| 6,769,273 B1 | 8/2004 | Nakagawa et al. | |
| 2006/0183623 A1 | 8/2006 | Ikuta | |
| 2011/0226020 A1 | 9/2011 | Xu et al. | |
| 2012/0148770 A1 * | 6/2012 | Rong | C03C 3/06 428/34.4 |
| 2013/0081484 A1 * | 4/2013 | Jones | B05D 1/18 73/864.91 |
| 2013/0095261 A1 | 4/2013 | Ahn | |

FOREIGN PATENT DOCUMENTS

| | | |
|---|---|---|
| JP | 2001335342 | 12/2001 |
| JP | 2003171128 | 6/2003 |
| JP | 2005145721 | 6/2005 |
| JP | 2008001586 | 1/2008 |
| JP | 2008535764 | 9/2008 |
| JP | 2009154090 A | 7/2009 |
| JP | 2013502372 | 1/2013 |

OTHER PUBLICATIONS

Patent Cooperation Treaty (PCT), International Search Report and Written Opinion for Application PCT/US2015/014158 filed Feb. 3, 2015, dated May 8, 2015, International Searching Authority, US.

* cited by examiner

FUSED QUARTZ TUBING FOR PHARMACEUTICAL PACKAGING AND METHODS FOR MAKING THE SAME

BACKGROUND OF THE INVENTION

Glass materials are often used in pharmaceutical packaging. There has been a recent trend in the pharmaceutical market toward the increased use of biological (protein-based) drugs that are more "sensitive" than traditional drugs. With these types of drugs, the topic of drug/container interaction becomes increasingly important due to the lower stability of these drugs and their propensity to degrade during storage, especially when formulated as a liquid. Because of this, extractable substances (e.g. dissolved cations) coming from the pharmaceutical packaging container can cause issues with regard to efficacy and purity of these drugs (including drug instability, toxicity, etc). *A Review of Glass Types Available for Packaging*, S. V. Sangra, Journal of the Parenteral Drug Association, Mar.-pr., 1979, Vol. 33, No. 2, pp. 61-67.

Cationic extraction from traditional glasses used in pharmaceutical packaging can create issues with the purity and/or effectiveness of such protein-based drugs. The mechanism of cationic extraction is typically hydronium/alkali ion exchange that causes a pH increase, which is then followed by bulk dissolution, especially in Type I (e.g., borosilicate glass, such as Schott Fiolax®) and Type II (treated soda-lime silicate) glasses. The poor chemical durability of these glasses arises from the fact that soluble cations, such as $Na^+$, $Li^+$, $K^+$, $Mg^{2+}$, $Ca^{2+}$ and/or $Ba^{2+}$ are used to flux these glasses to achieve a suitably low working point temperature that makes them highly processable with standard glass melting equipment (see, e.g., U.S. Pat. Nos. 5,782,815 and 6,027,481).

Glass particle generation due to delamination is one of the major concerns in pharmaceutical packaging industries when Type I and Type II glasses are used as the container for pharmaceutical products. Delamination occurs when top layers of a glass separate at a scale that is barely visible or invisible to the naked eyes as shown in FIG. 1 of Ronald G Iacocca, "The Cause and Implications of Glass Delamination", Pharmaceutical Technology, 2011, pp s6-s9, the disclosure of which is incorporated herein by reference in its entirety. The particles become suspended in drug solutions, posing a serious risk to the consumer.

Glasses without chemical modifiers (e.g., alkali metals, borates, alkaline earth metals) such as fused quartz glass are preferable from a chemical purity (low extractables) and chemical durability perspective, but it was previously believed such glasses may be difficult to manufacture due to the high processing temperatures required (typically >2,000° C.). Even when fused quartz glasses can be melted and formed into tubing, it is then often difficult to flame convert them into pharmaceutical packages (vials, syringe barrels, ampoules, etc), due to a high working point temperature (>1,700° C.). Thus, such glasses have generally not been used to manufacture pharmaceutical packaging. U.S. Pat. Nos. 6,200,658 and 6,537,626 show that efforts have been made to coat the interior surfaces of traditional glass containers with a layer of silica to reduce extractables (e.g., Schott Type I Plus®) and glass particles that are produced through delamination. Providing coated articles, however, are cumbersome and expensive and, therefore, not widely accepted in the pharmaceutical packaging market. Thus, there is a need for a cost-effective process to produce pharmaceutical packaging glass that exhibits low extractables and leachables that can be used in pharmaceutical packaging applications.

Further, glass compositions formed to be of high purity can still contain contaminants from the glass formation process. Such contaminants can still be present in a concentration that the glass would not be suitable for use in pharmaceutical applications. Thus there is a need for a robust "clean" process to ensure the surface purity of pharmaceutical packaging glasses.

BRIEF DESCRIPTION

The present subject matter provides methods of forming articles comprising fused silica. The methods allow for the formation of high purity glass articles suitable for use in pharmaceutical applications.

In one aspect, the present invention provides a method of forming an article of high purity fused silica comprising:
  (a) heating a raw material comprising $SiO_2$ to form a fused quartz melt;
  (b) forming a quartz glass tube from the fused quartz melt;
  (c) treating the quartz glass tube with a composition comprising an acid composition followed by a water rinse; and
  (d) heat treating the quartz glass tube.

In another aspect, the present invention provides a method of forming a pharmaceutical package comprising:
  (A) providing quartz glass tubing having a $SiO_2$ concentration of about 99% or greater, the quartz glass tubing being produced by a process comprising:
    (i) heating a raw material comprising $SiO_2$ to form a fused quartz melt;
    (ii) forming a quartz glass tube from the fused quartz melt;
    (iii) treating the quartz glass tube with a composition comprising an acid composition followed by a water rinse, and
    (iv) heat treating the quartz glass tube; and
  (B) converting the quartz glass tubing into a pharmaceutical package.

In still another aspect, the present invention provides a method of forming an article comprising a high purity silica, the method comprising;
  (a) heating a $SiO_2$ raw material having a $SiO_2$ concentration of about 99% or greater at a temperature of from about 2000° C. to about 3000° C. to form a fused quartz material;
  (b) drawing the fused quartz material to form a quartz tube;
  (c) treating the quartz tube with an acid composition at a temperature of from about 10° C. to about 100° C.;
  (d) washing the quartz tube treated in (c) with water; and
  (e) heating the quartz tube at a temperature of from about 900° C. to about 1250° C. and a pressure of 10 torr or less.

Drugs are packaged in various glass pharmaceutical containers, including single-use pre-filled syringes, cartridges, ampoules, vials and the like. The present technology allows for the production of forming high purity silica tubing that can be used to form such containers. The tubing optionally does not contain appreciable amounts of traditional glass modifiers (e.g., alkali metals, alkaline earth metals, and borate ions), and the resulting packaging is thus highly resistive to cationic extraction when placed in contact with an aqueous-based solution intended for drug formulation. Still further, the process allows for reducing or substantially preventing the introduction of contaminants into the glass during formation of the tubing. In one embodiment, the inventions provide a pharmaceutical packaging that exhibits little or no glass particle generation through delamination.

DETAILED DESCRIPTION

Figure 1:
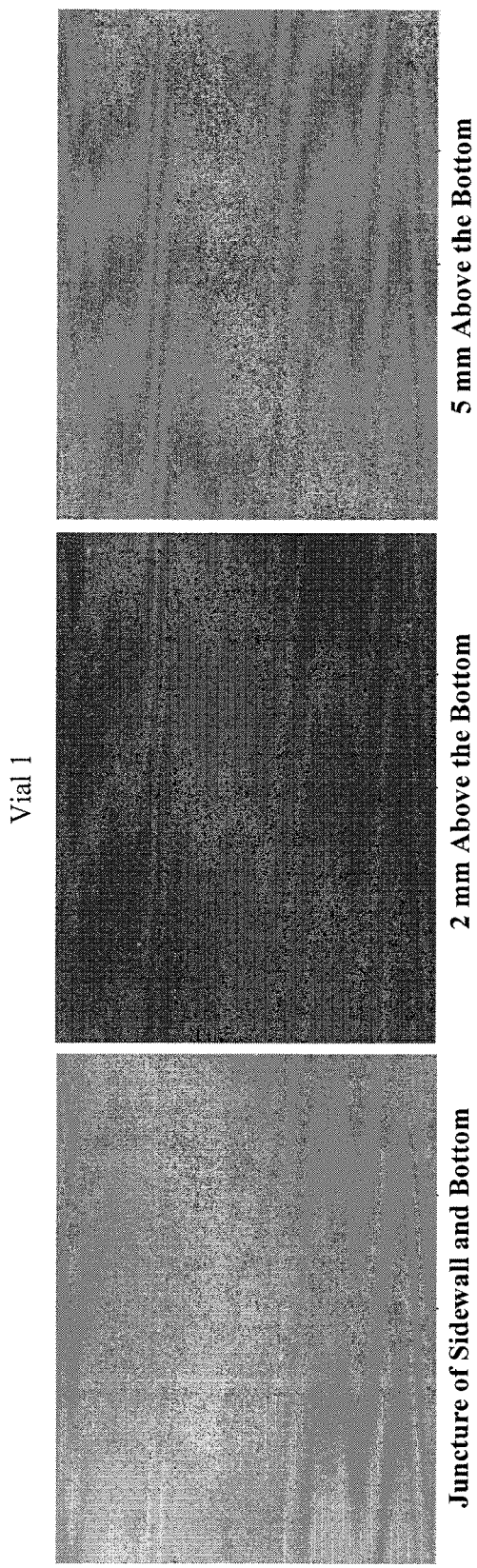
FIGS. 1-3 are scanning electron microscope images of the inside portion of vials evaluated for delamination testing.

As used herein, approximating language may be applied to modify any quantitative representation that may vary without resulting in a change in the basic function to which it is related. Accordingly, a value modified by a term or terms, such as "about" and "substantially," may not to be limited to the precise value specified, in some cases.

As used herein, the term "functionalized" may be used interchangeably with "surface functionalized," "functionalized surface," "coated," "surface treated," or "treated," referring to the coating of the silica and dopant components with the dispersing agent of the invention. As used herein, "coating agent" is used interchangeably with "dispersing" agent.

Although the terms may be used to denote compositions or articles of different materials (different silica concentrations), as used herein, the term "glass" may be used interchangeably with "quartz glass" or "quartz" or "fused quartz," referring to a composition, a part, a product, or an article formed by melting a mixture comprising natural or synthetic sand (silica). It is well known that the viscosity of a glass will decrease as its temperature increases. Thus, as used herein, the terms "working point temperature" and "working temperature" are both used to mean the temperature at which the glass reaches a viscosity of $10^4$ poise or below, and the softening point describes the temperature where the viscosity reaches $10^{7.6}$ poise. Either or both natural or synthetic sand (silica) can be used in the composition of the invention, and the term silica is used to denote compositions comprising either naturally occurring crystalline silica such as sand/rock, or synthetically derived silicon dioxide (silica), or a mixture of both. The term "sand" may be used interchangeably with silica, denoting either natural sand or synthetic sand, or a mixture of both.

In one embodiment, the present subject matter provides a method for forming high purity silica articles. The high purity silica articles can be particularly suitable for forming packaging such as packaging for pharmaceutical applications. The method for forming high purity silica articles can comprise, in one embodiment, (a) forming a fused quartz melt from a $SiO_2$ raw material; (b) forming a quartz tube from the fused quartz melt; (c) treating the quartz tube with an acid composition followed by a water rinse; (d) heat treating the quartz tube subsequent to treating with the acid composition; and (e) optionally treating the quartz article with an acid composition followed by a water rinse subsequent to the heat treating operation. The method provides a quartz article that is of high purity and suitable for applications requiring high purity levels.

In the method, the fused quartz melt can be formed by any suitable process and generally comprises heating a raw silica material at a sufficiently high temperature to form a melt. Heating can be conducted in a reduced environment comprising nitrogen, hydrogen, deuterium, helium, or a mixture of two or more thereof. Heating is carried out at a temperature of about 2,000° C. or greater. In one embodiment, heating is carried out at a temperature of from about 2,000° C. to about 2,600° C.; from about 2,100° C. to about 2,500° C.; even from about 2,200° C. to about 2,400° C. Heating is conducted at a sufficient temperature and for a sufficient time to fuse the silica material.

The melting can be conducted using a furnace system containing a melting crucible. The melting crucible can be formed from tungsten, molybdenum, or a combination thereof. The arrangement of the furnace is not particularly limited. In one embodiment, a furnace system such as those described in U.S. Pat. No. 6,422,861 or 6,739,155, each of which is incorporated herein by reference in its entirety, can be used to form the fused silica melt.

The silica used to make the glass and subsequent articles formed from such glass is generally not limited and can be selected as desired for a particular application or end use. Depending on the end application, the glass can be provided by a silica composition having a selected concentration of silica and can be doped or un-doped. In one embodiment, un-doped silica is used to make the glass and subsequent pharmaceutical packaging articles.

The silica ($SiO_2$) used in the glass compositions of the present embodiments and for forming the silica melt can be chosen as desired for a particular purpose or intended application. The silica can be synthetic sand, natural sand, or a mixture thereof. In one embodiment, the amount of $SiO_2$ in the glass composition ranges from about 82 to about 99.9999%. In another embodiment, the amount of $SiO_2$ in the glass composition ranges from about 92 to about 99.9999%; from about 96 to about 99.9999 wt. %; from about 97 to about 99.9999 wt. %; even from about 98 to about 99.9999 wt. %. In another embodiment, the glass comprises a light-transmissive, vitreous composition with a $SiO_2$ content of at least about 90 wt. %. In still another embodiment of a quartz composition with a high melting point, at least 95 wt. % $SiO_2$ is used. In yet another embodiment, the glass composition has a $SiO_2$ concentration of at least about 97 wt. %; at least about 98 wt. %; even at least about 99 wt. %. In still other embodiments, the glass compositions and articles formed therefrom can have a $SiO_2$ content of 99 wt. % or greater, 99.9 wt. % or greater, 99.99 wt. % or greater, 99.999 wt. % or greater. In further embodiments, the glass composition can have a $SiO_2$ content of about 99 wt. % to about 99.9999 wt. %, about 99.5 wt. % to about 99.9995 wt. %, about 99.9 wt. % to about 99.999 wt. %, even about 99.99 wt. % to about 99.995 wt. %. Here as elsewhere in the specification and claims, ranges can be combined to form new and non-disclosed ranges.

Depending on the desired properties in the final product, a number of different dopants and mixtures thereof may also be added to the silica. Dopants are selected such that they reduce the working point temperature of the glass and its viscosity at a particular temperature and also such that the final glass product will exhibit low extractables and/or leaching of ions into drugs, aqueous drug formulations, or other compositions that come into contact therewith. Particularly suitable dopants are those that exhibit low solubility in the various (aqueous-based) contemplated drug compositions. Examples of suitable dopants include $Al_2O_3$, $G_eO_2$, $Ga_2O_3$, $CeO_2$, $ZrO_2$, $TiO_2$, $Y_2O_3$, $La_2O_3$, $Nd_2O_3$, other rare earth oxides, and mixtures of two or more thereof. In one embodiment, the dopant is neodymium oxide $Nd_2O_3$. In another embodiment, the dopant is aluminum oxide by itself, e.g., $Al_2O_3$, or a mixture of aluminum oxide and other dopants. In another embodiment, the dopant is $CeO_2$. In yet another embodiment, titanium oxide ($TiO_2$) may be added. In another embodiment, the dopant comprises europium oxide, $Eu_2O_3$, by itself, or in combination with other dopants such as $TiO_2$ and $CeO_2$. In still another embodiment, the dopant is yttrium oxide. Of course, as previously described, the glass composition may comprise a single dopant or any suitable combination of two or more different dopants.

In one embodiment, the dopant is present in an amount of from about 0.0001 to about 8% by weight of the total composition. In another embodiment, the dopant(s) may be present in an amount of from about 0.01 to about 8 wt. %, and in still another embodiment from about 0.1 to about 8 wt. %. In another embodiment, the dopant is present in an amount of from about 0.5 to about 5% by weight of the glass composition. It will be appreciated that some dopants may be added in an amount as low as about 0.01 wt. %, and may be, for example, in a range of from about 0.01 to about 0.1 wt. % including, for example, from about 0.01 to about 0.05 wt. %. In one embodiment, the dopants are to be added in an amount to reduce the working point temperature of the resultant quartz composition to less than 1,650° C. In another embodiment, the total amount of dopants is in the range of about 0.01 to about 8 wt. %. In still another embodiment, the total amount of dopant ranges from about 0.1 to about 8 wt. %.

Depending on the identity of the dopant(s) and the amount of dopant(s) present in the glass composition, the subsequent doped fused quartz glass composition exhibits a working point in the range of from about 1000 to 2,000° C. In one embodiment, the glass composition exhibits a working point of from about 1400 to about 1,900° C. In another embodiment, the doped fused quartz glass has a working point of about 1,700° C. or less, which may be much lower than the working point of un-doped quartz glass. The glass compositions may have a softening point of from about 500 to about 1,700° C. In one embodiment, the glass composition has a softening point of from about 1,000 to about 1,600° C. In another embodiment, the glass composition has a softening point of from about 1,400° C. to about 1,600° C. Due to these lower working points exhibited by these doped glasses, the rods or tubes may be subsequently shaped into various pharmaceutical packaging articles more easily (by means of for instance flame conversion) than would an un-doped quartz glass.

The fused quartz melt can then be formed into a quartz glass article. The article can be formed into a shape as desired for a particular purpose or intended application. In one embodiment, the fused quartz melt can be drawn into tubes. A glass article having a desired shape and dimensions is achieved by providing an appropriate die and core configuration. The outer diameter of the tube and the inner diameter of the tube can be selected as desired for a particular purpose or intended application. The fused quartz melt is cooled to solidify the material and form the quartz glass article.

In one embodiment wherein the glass product is in the form of continuous tube drawing, e.g., the tubes can be made by any process known in the art including the Danner process, the Vello process, a continuous draw process or modified processes thereof.

In another embodiment of making glass tubes using processes known in the art including, for example, a continuous draw process of at least two steps. In the first step, an elongated, consolidated preform having an aperture is formed with a relatively thick wall. The second step involves heating the heavy walled tubing to a temperature sufficient high to flow the silica and drawing it freely to form a tube of a desired structure and dimension. In one example, the tubing can have OD ranges from 0.5 mm to 50 mm.

The dimensions of the tubes formed from the silica composition are not limited and can be selected as desired. In one embodiment, tubes have sizes ranging from 0.1 mm to 100 mm outside diameter (OD); 0.5 mm to about 50 mm; 1 mm to about 10 mm; even 3 mm to about 5 mm. The thickness of the tubing can be in the range of from about 0.2 mm to about 5 mm; 0.5 to about 3 mm; even about 1 mm to about 2 mm, depending on the size of the tubing. The length of the tubes can be selected as desired to allow for handling and workability and can be, for example, 100 mm, 200 mm, 300 mm etc.

Optionally, the quartz glass articles can be cut to a first, desired length. The quartz glass articles can be cut to a particular length to allow for easier handling of the article during processing and for forming a final article.

After forming the quartz glass article, the article is treated with an acid composition. Applicants have found that the purity of the quartz glass article can be enhanced by treating with the acid composition. Without being bound to any particular theory, it is believed that treating with the acid composition can enhance the surface purity of the article. The acid composition can comprise a hydrochloric acid, a hydrofluoric acid, hydrogen bifluoride, ammonium bifluoride, nitric acid, phosphoric acid, or a combination of two or more thereof. The concentration of the acid in the acid composition can be from about 1 percent to about 60 percent, from about 2 percent to about 30 percent, even from about 3 percent to about 10 percent. Here as elsewhere in the specification and claims, numerical values can be combined to form new and undisclosed ranges.

The conditions for treating the quartz glass article with the acid composition can be chosen as desired. In one embodiment, the time period for the acid wash can be from about 10 seconds to about 1000 minutes; 30 seconds to 500 minutes; 1 minute to 100 minutes; even 5 minutes to about 10 minutes. Here as elsewhere in the specification and claims, numerical values can be combined to form new and undisclosed ranges. In one embodiment, the treatment with the acid composition can be conducted at a temperature of from about 10° C. to about 100° C., from about 20° C. to about 90° C., from about 30° C. to about 75° C., even from about 40° C. to about 60° C. Here, as elsewhere in the specification and claims, numerical values can be combined to form new and non-disclosed ranges.

Following treatment with the acid, the quartz glass article is washed with water to remove the residual acid from the surface of the article. Generally, the water wash is conducted with deionized water and, in one embodiment, can be conducted using high purity deionized water. In one embodiment, the deionized water has a resistivity of about 18 M ohm·cm. Treating with the acid composition can be conducted once or can be conducted two or more times. Where the acid treatment step is conducted more than once, the process comprises washing the quartz glass article with water subsequent to each acid treatment operation.

Following the acid wash and water rinse, the quartz glass article is dried. Drying can be accomplished by any suitable method including air drying, IR heating drying, or blow drying with a clean, purified gas.

Subsequent to treating with the acid, the fused quartz article is heat treated. The heat treatment operation can reduce the hydroxyl concentration of the quartz. The heat treatment can be conducted at a temperature of from about 900° C. to about 1,250° C., and, in one embodiment, from about 1,000° C. to about 1,150° C. The heat treatment can be conducted under vacuum and at a pressure of about 10 torr or less, about 1 torr or less, even about 100 mtorr or less. In one embodiment, the heat treatment is conducted at a pressure of from about 100 mtorr to about 10 torr. The heat treatment can be conducted for a period of time from about 1 hour to about 100 hours, from about 10 hours to about 90 hours, even from about 25 hours to about 75 hours. In one embodiment, the heat treatment can be conducted for a time period of from about 1 hour to about 10 hours, even about 2 hours to about 5 hours.

The heat treating operation is desirably conducted in a clean environment. In one embodiment, the heating apparatus comprises a high purity lining. Examples of suitable linings include, but are not limited to, high purity fused quartz, high purity graphite, etc.

After the heat treating operation, the quartz glass article can be further cut, if desired, to allow for handling and/or to cut or shape into a final product. The method or manner of cutting the articles is not limited and can be achieved, for example, by saw cutting, waterjet cutting, laser cutting, etc.

If the articles are cut subsequent to the heat treatment operation, the articles can again be treated with an acid composition. The acid treatment step can be conducted using acids and operating conditions as previously discussed with respect to the acid treatment operation conducted following initial formation of the article. As with the previous described washing operation, the article can be washed with water following acid washing treatments and the article dried after the final water rinse.

Desirably, the various operations for forming the quartz articles are conducted in a clean and controlled environment. In embodiments, the acid wash and water rinse treatments are conducted in a clean and controlled environment.

The quartz glass article can be formed into a final product, e.g., a pharmaceutical package by any suitable method. Products of different shapes or configurations can be produced for particular purpose or intended application. In one aspect, glass compositions in accordance with the present invention are particularly suitable for forming a pharmaceutical packaging article such as, for example, pre-filled syringes, syringe barrels, ampoules, vials, and the like.

A pharmaceutical package or article formed from the glass compositions desirably exhibit excellent leaching characteristics, i.e., lower leaching of metals, when an inner surface of the package or article is in contact with an aqueous pharmaceutical composition including, but not limited to, drug and medicinal formulations. In one embodiment, a pharmaceutical packaging article comprising the doped glass may be provided such that the article is substantially free of a coating layer disposed on the surface of the article in contact with a pharmaceutical composition. Articles employing a doped glass as described herein can be free of a coating and exhibit leaching characteristics when in contact with a pharmaceutical composition that is at least comparable to coated BSi or soda lime glasses and superior to uncoated BSi or soda lime glasses.

A glass composition in accordance with the present invention can be used to form a homogenous, fused glass article. A glass article formed from a glass composition in accordance with the present invention may exhibit leaching characteristics superior to borosilicate (BSi) glasses and/or soda lime (Na—Ca) glasses. In one embodiment, a glass article in accordance with the present invention exhibits superior leaching characteristics with respect to cations or metals when the glass is subjected to HCl digestion. As used herein, "HCl digestion" means hydrothermally treating a 10.0 g sample of a glass article (that has been crushed into 5-10 nm in size) with 50 ml of 0.4 M HCl solution in a Parr teflon digestion bomb at 121° C. for 2 hours. In one embodiment, the leaching characteristics of the glass may be represented in terms of extractable metal concentration, which refers to the concentration of metal extracted from the glass article when subjected to HCl digestion. In one embodiment, a glass article formed from a glass composition has a total extractable metal concentration of about 8 mg/L or less when subjected to HCl digestion, the total extractable metal concentration being represented by the total concentration of Al, B, Na, Ca, K, Li, Ba, and Mg extracted upon HCl digestion. In another embodiment, a glass article formed from a glass composition has a total extractable metal concentration of about 5 mg/L or less when subjected to HCl digestion, the total extractable metal concentration being represented by the total concentration of Al, B, Na, Ca, K, Li, Ba, and Mg extracted upon HCl digestion. In still another embodiment, a glass article formed from a glass composition has a total extractable metal concentration of about 1 mg/L or less when subjected to HCl digestion, the total extractable metal concentration being represented by the total concentration of Al, B, Na, Ca, K, Li, Ba, and Mg extracted upon HCl digestion.

In one embodiment, the total extractable metal concentration is from about 0.01 to about 8 mg/L; from about 0.05 to about 5 mg/L; even from about 0.1 to about 1 mg/L. Here as elsewhere in the specification and claims, numerical values can be combined to form new or undisclosed ranges.

In one embodiment, a pharmaceutical packaging article comprising the glass composition is formed by thermal processing, such as flame conversion process. The article exhibits little or no alkali oxide, alkaline earth oxide, or borate formation at or near the surface of the article during the thermal processing. In one embodiment, the concentration of alkali metals, alkaline earth metals, and/or boron is about 5 wt % or less within a distance of 50 μm of the surface of the article. In one embodiment the concentration of alkali metals, alkaline earth metals, or boron is 1 wt % or less within 50 μm of the surface of the article. In one embodiment the concentration of alkali metals, alkaline earth metals, or boron is 1000 ppm or less within 50 μm of the surface of the article. In one embodiment the concentration of alkali metals, alkaline earth metals, or boron concentration is 100 ppm or less within 50 μm of the surface of the article. The alkali, alkaline earth, or boron concentration within 50 μm of the surface of the article may be determined by any suitable method including surface etching followed by Inductively Coupled Plasma Mass Spectrometry (ICP-MS). It will be appreciated that the alkali metal or alkaline metal can be derived from any alkali metal compound or alkaline metal compound including, but not limited to, oxides or hydroxides of alkali or alkaline metals.

Aspects of the present invention may be further understood with respect to the following examples.

EXAMPLES

Momentive type 214 quartz tubing (pure un-doped fused quartz) was formed and treated in accordance with the processes described herein. The tubing was tested following US Pharmacopoeia (USP) packaging test protocol at American Glass Research. Specifically, surface glass test, powdered glass test, and delamination examination were performed on type 214 quartz samples, and significant improvement has been observed compared to type I and type II glasses.

Surface Glass Test (Small Volume Vial):

The test was performed according to USP 33<660>, which has a detailed description of the test protocol. 60 quartz vials made from type 214 quartz were used for the test. The vial size is at 3 mL. The filling volume is 3.2 mL.

The results indicated the "average mL 0.01 M HCL per 100 mL" is at 0.10. As for comparison, the maximum limit for types I and II glasses at the same vial size range for this parameter is 1.3. During vial production using types I and II glasses, it is not uncommon that certain vials can fail in this characterization, and the typical values are often not much less the maximum limit at 1.3. Vials made from type 214 quartz tubing according to the current disclosed processes achieved an order of magnitude improvement in this characteristic.

Surface Glass Test (Larger Volume Vial):

The test was performed according to USP 36<660>, which has a detailed description of the test protocol. 12 quartz vials made from type 214 quartz were used for the test. The vial size is at 20 mL. The filling volume is 24.4 mL. The results indicated the "average mL 0.01 M HCL per 100 mL test solution" is at 0.025. As for comparison, the maximum limit for types I and II glasses at the same vial size range for this parameter is 0.60. Vials made from type 214 quartz tubing according to the current disclosed processes for this size range again achieved more than one order of magnitude improvement in this characteristic.

Powdered Glass Test:

The test was performed according to USP 36<660>, which has a detailed description of the test protocol. 1 quartz vial made from type 214 quartz was used for the test. The vial size is at 20 mL. The results indicated the "mL 0.02 N HCL per 100 mL HCl per Gram of Glass" is at 0.002. As for comparison, the maximum limit for types I glass for this parameter is 1.0, while it is 8.5 for type III glass. Thus, vials made from type 214 quartz tubing according to the current disclosed processes achieved more than two orders of magnitude improvement in this characteristic.

Delamination Test (Inside Surface Examination of 2 ml Quartz Vials):

Three 2 ml quartz vials that were previously USP tested were used to examine the inside surface for evidence of blisters or pitting of the glass that could facilitate delamination. The examination of the three quartz vials showed no evidence of blisters or pitting of the glass that could facilitate delamination.

The vials were examined up to a magnification of 80× using a stereomicroscope with low angled reflected fiber optic light. This examination was performed in order to view the effects, if any, from the processes the glass has encountered by forming and USP testing. Three vials were cut in cross-section lengthwise and rinsed with deionized water. Cotton tipped swabs were used to remove dust from the surface not easily removed with the water rinse. The inside surface of the vials were examined at 5000× using a scanning electron microscope (SEM) to determine the presence of surface flaws such as blisters, pitting or sections of missing glass.

Typically, the lower inside portion of vials is more susceptible to delamination due to additional processes the vial may encounter. Therefore, the SEM examination was focused at the lower portion of the vial where the inside bottom meets the sidewall and up the sidewall approximately 1 centimeter.

Figure 2:
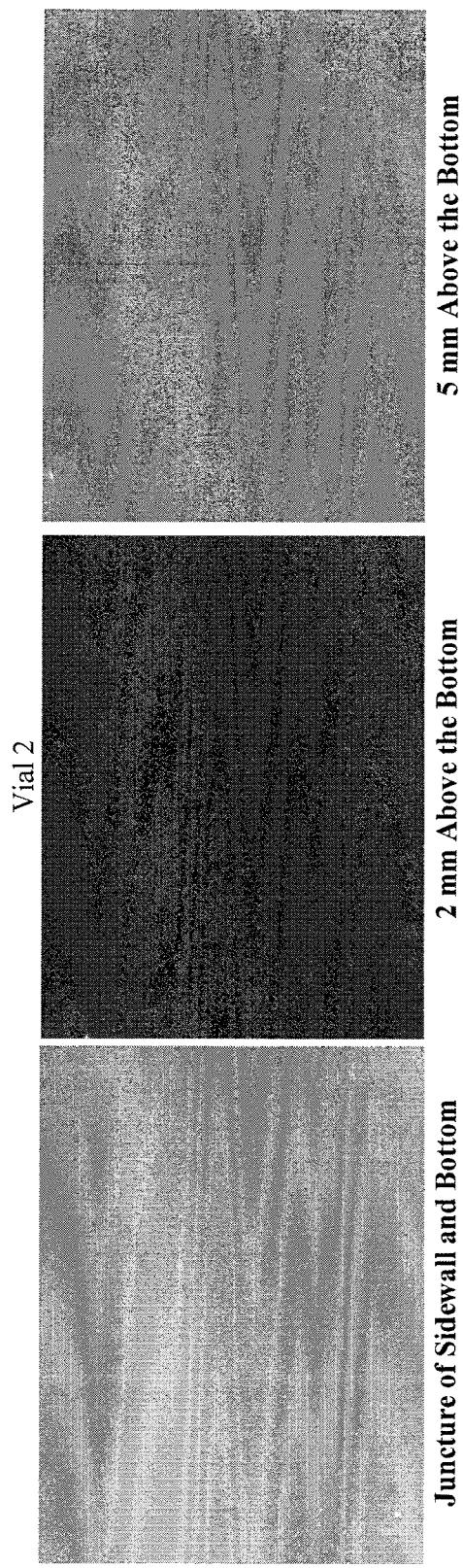
Figure 3:
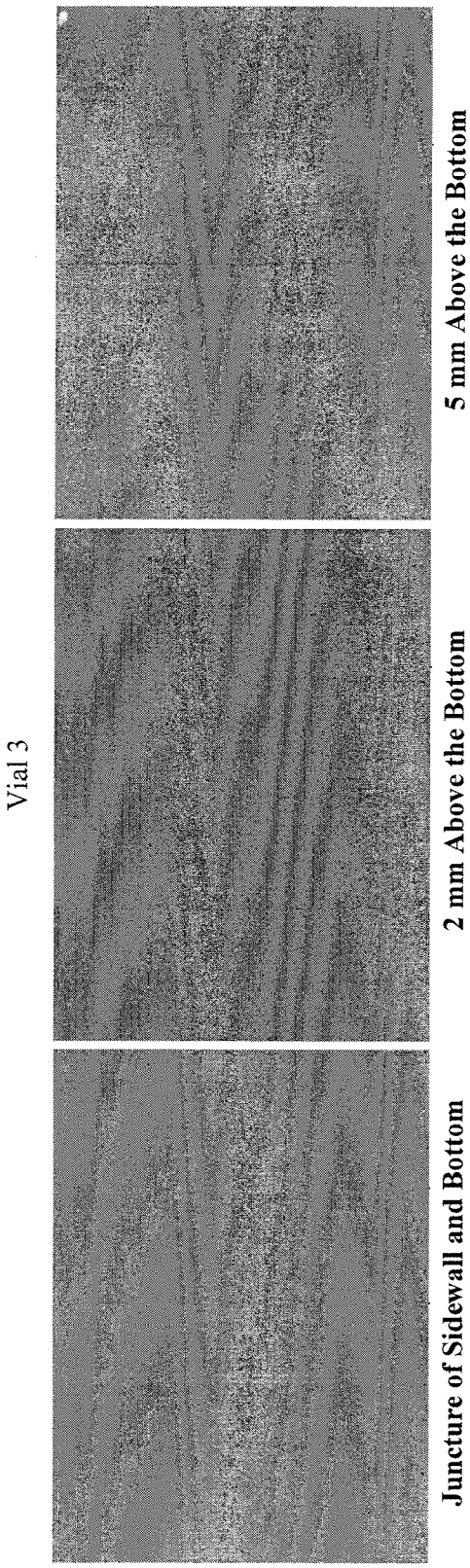

The stereomicroscope examination of the inside surface of the three vials showed no evidence of any surface anomaly. Further study using the SEM revealed no other anomalies, such as blisters and pitting at any location from the base of the sidewall up to approximately the 1 cm height. All three of the vials were similar in appearance as represented in FIGS. 1-3.

Embodiments of the invention have been described above and, obviously, modifications and alterations will occur to others upon the reading and understanding of this specification. The invention and any claims are intended to include all modifications and alterations insofar as they come within the scope of the claims or the equivalent thereof.

What is claimed is:

1. A method of forming an article comprising high purity fused silica comprising:
   (a) heating a raw material comprising $SiO_2$ to form a fused quartz melt;
   (b) forming a quartz glass tube from the fused quartz melt;
   (c) treating the quartz glass tube from (b) with a composition comprising an acid followed by a water rinse to remove the acid from the glass tube;
   (d) heat treating the quartz glass tube from (c) at a temperature of from about 900° C. to about 1250° C.; and
   (e) converting the quartz glass tube into a pharmaceutical package via thermal processing, wherein the article has a surface glass test result equal to or less than 0.10 ml of 0.01M HCl per 100 ml of test solution according to the USP<660> surface glass test.

2. The method of claim 1, wherein the acid comprises an acid chosen from hydrofluoric acid, hydrochloric acid, hydrogen bifluoride, ammonium bifluoride, nitric acid, phosphoric acid, or a combination of two or more thereof.

3. The method of claim 1, wherein treating with the composition comprising the acid is conducted at a temperature of from about 10° C. to about 100° C.

4. The method of claim 1, wherein the treating operation (c) comprises agitating the acid composition and/or the quartz glass tube.

5. The method of claim 1, wherein the treating operation (c) is conducted two or more times with or without other process steps in between, and the quartz glass tube is washed with water subsequent to each treating operation (c).

6. The method of claim 1, wherein step (e) further comprises:
   cutting the quartz glass tube subsequent to operation (d) to form cut quartz glass sections; and
   washing the cut quartz glass sections with an acid composition followed by a water rinse.

7. The method of claim 6, wherein the acid composition comprises an acid chosen from hydrofluoric acid, hydrochloric acid, hydrogen bifluoride, ammonium bifluoride, nitric acid, phosphoric acid, or a combination of two or more thereof.

8. The method of claim 1, wherein the article has a $SiO_2$ concentration of about 99% or greater.

9. The method of claim 1, wherein the surface glass test result is equal to or less than 0.025 of 0.01 M HCl per 100 ml of test solution.

10. A method of forming a pharmaceutical package comprising:
   (A) providing quartz glass tube having a $SiO_2$ concentration of about 99% or greater, the quartz glass tube being produced by a process comprising:
      (i) heating a raw material comprising $SiO_2$ to form a fused quartz melt;
      (ii) forming a quartz glass tube from the fused quartz melt;
      (iii) treating the quartz glass tube from (A)(ii) with a composition comprising an acid followed by a water rinse to remove the acid, and
      (iv) heat treating the quartz glass tube following (A)(iii);

(v) cutting the quartz glass tube to desired lengths suited for pharmaceutical packaging; and (B) converting the quartz glass tube into a pharmaceutical package via thermal processing, wherein the package has a surface glass test result equal to or less than 0.10 ml of 0.01M HCl per 100 ml of test solution according to the USP<660> surface glass test.

11. The method of claim 10, wherein converting the quartz glass tube into a pharmaceutical package comprises converting the tube into a package in the form of a vial, an ampoule, or a syringe.

12. The method of claim 10, wherein the treating operation (iii) is conducted at a temperature of from about 10° C. to about 100° C.

13. The method of claim 10, wherein the treating operation (iii) comprises agitating the composition comprising the acid and/or the quartz glass tube.

14. The method of claim 10, wherein the treating operation (iii) is conducted two or more times, with or without other process steps in between, and the quartz glass tube is washed with water subsequent to each treating operation.

15. The method of claim 10, wherein the heat treating operation (iv) comprises heating at a temperature of from about 900° C. to about 1250° C. at a pressure of about 10 torr or less.

16. A method forming a pharmaceutical package from an article comprising a high purity silica, the method comprising;

(a) heating a $SiO_2$ raw material having a $SiO_2$ concentration of about 99% or greater at a temperature of from about 2000° C. to about 3000° C. to form a fused quartz material;

(b) drawing the fused quartz material to form a quartz tube;

(c) treating the quartz tube from (b) with an acid composition at a temperature of from about 10° C. to about 100° C.;

(d) washing the quartz tube treated in (c) with water to remove the acid from (c);

(e) heating the quartz tube from (d) at a temperature of from about 900° C. to about 1250° C. and a pressure of 10 torr or less; and (f) converting the quartz tube into a pharmaceutical package via thermal processing, wherein the article has a surface glass test result equal to or less than 0.10 ml of 0.01M HCl per 100 ml of test solution according to the USP<660> surface glass test.

17. The method of claim 16, wherein the acid composition comprises an acid chosen from hydrofluoric acid, hydrochloric acid, nitric acid, hydrogen bifluoride, ammonium bifluoride, phosphoric acid, or a combination of two or more thereof.

18. The method of claim 16, further comprising:

(f) cutting the quartz tube subsequent to operation (e) to form cut quartz glass sections; and (g) washing the cut quartz glass sections with an acid composition followed by a water rinse.

19. The method of claim 16, wherein the treating operation comprises agitating the acid composition and/or quartz tube.

20. The method of claim 16, comprising drying the quartz tube following the washing operation (d).

* * * * *